United States Patent
Daniel et al.

(10) Patent No.: US 11,994,257 B2
(45) Date of Patent: May 28, 2024

(54) CENTRIFUGAL DE-AERATOR FOR AIRCRAFT ENGINE

(71) Applicant: PRATT & WHITNEY CANADA CORP., Longueuil (CA)

(72) Inventors: Marion Daniel, Montreal (CA); Pierre Gauvin, St-Bruno-de-Montarville (CA); Adam Logan, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 818 days.

(21) Appl. No.: 15/931,032

(22) Filed: May 13, 2020

(65) Prior Publication Data
US 2021/0356077 A1 Nov. 18, 2021

(51) Int. Cl.
*F16N 39/00* (2006.01)
*B01D 19/00* (2006.01)
*F01D 25/18* (2006.01)

(52) U.S. Cl.
CPC ....... *F16N 39/002* (2013.01); *B01D 19/0052* (2013.01); *F01D 25/18* (2013.01); *F05D 2220/323* (2013.01); *F05D 2260/609* (2013.01); *F05D 2260/98* (2013.01); *F16N 2210/02* (2013.01)

(58) Field of Classification Search
CPC .............. F16N 39/002; B01D 19/0052; B01D 19/0057
See application file for complete search history.

(56) References Cited

U.S. PATENT DOCUMENTS

| | | | |
|---|---|---|---|
| 4,714,139 A | 12/1987 | Lorenz et al. | |
| 5,114,446 A | 5/1992 | Giersdorf et al. | |
| 10,036,508 B2 | 7/2018 | Bordne et al. | |
| 10,322,362 B2 | 6/2019 | Ishida et al. | |

(Continued)

FOREIGN PATENT DOCUMENTS

| | | |
|---|---|---|
| DE | 749024 | 9/1952 |
| DE | 1114437 | 9/1961 |

(Continued)

OTHER PUBLICATIONS

European Search Report dated Oct. 1, 2021, EP Application No. 21173769.7.

*Primary Examiner* — Elizabeth Insler
(74) *Attorney, Agent, or Firm* — NORTON ROSE FULBRIGHT CANADA LLP

(57) ABSTRACT

A de-aerator for a lubrication system, has: a housing defining an air-oil inlet, an oil outlet, and an air outlet of the de-aerator; a rotor received within the housing and rotatable relative to the housing about a central axis, the rotor having blades distributed about the central axis and extending at least partially radially relative to the central axis, flow passages extending between the blades, the rotor having a hub circumferentially extending around the central axis and around the blades, the hub having a peripheral wall oriented radially inwardly and defining a fore opening leading to the flow passages; and a gap between the housing and the hub of the rotor, a portion of the housing received within the fore opening and axially overlapping the peripheral wall of the hub, the gap having a fore gap inlet between the portion of the housing and the peripheral wall of the hub.

18 Claims, 6 Drawing Sheets

(56) References Cited

U.S. PATENT DOCUMENTS

2016/0218590 A1\* 7/2016 Oxman ................ F04D 29/041
2018/0119617 A1\* 5/2018 Pulter ................ B01D 19/0057
2019/0308128 A1 10/2019 Brouillet et al.

FOREIGN PATENT DOCUMENTS

EP 2199614 6/2010
EP 3315182 5/2018

\* cited by examiner

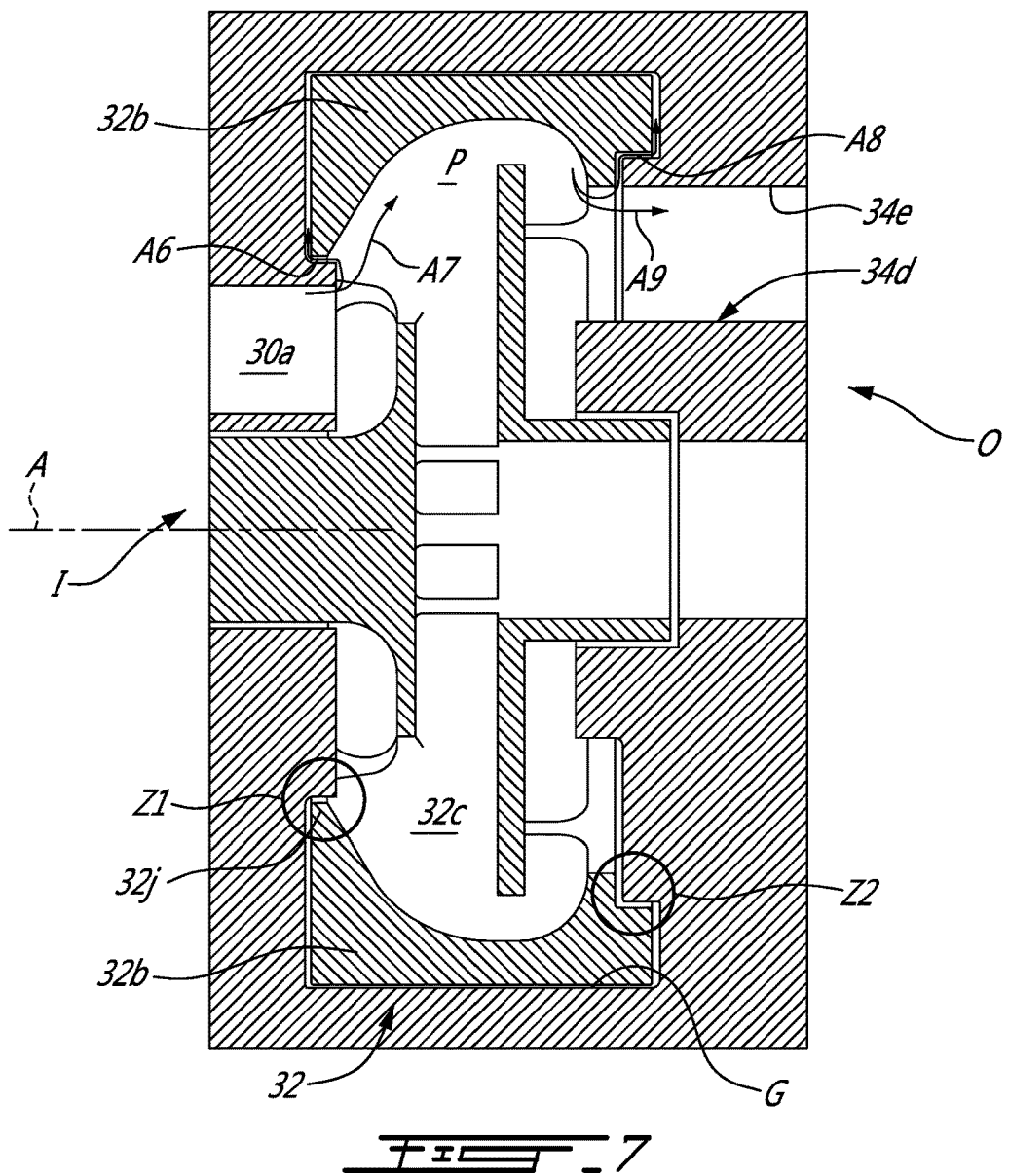

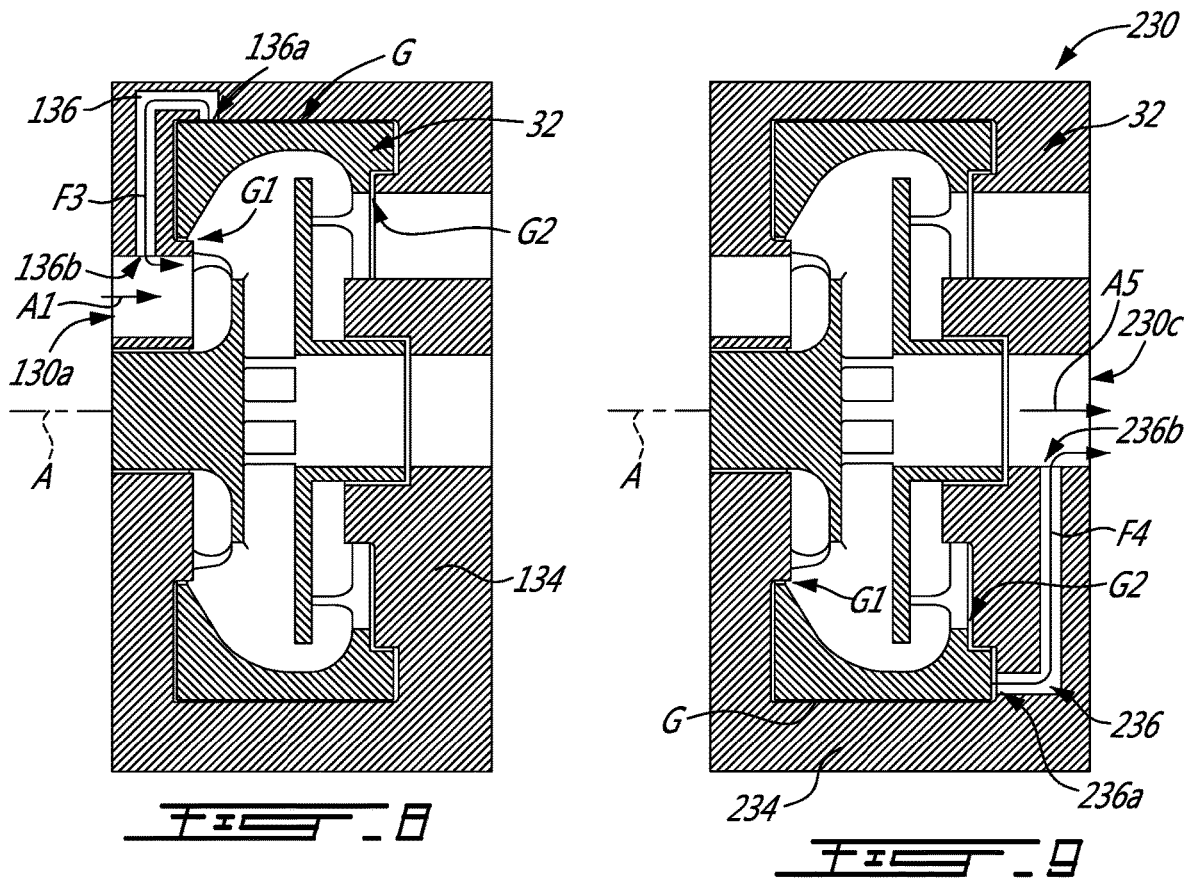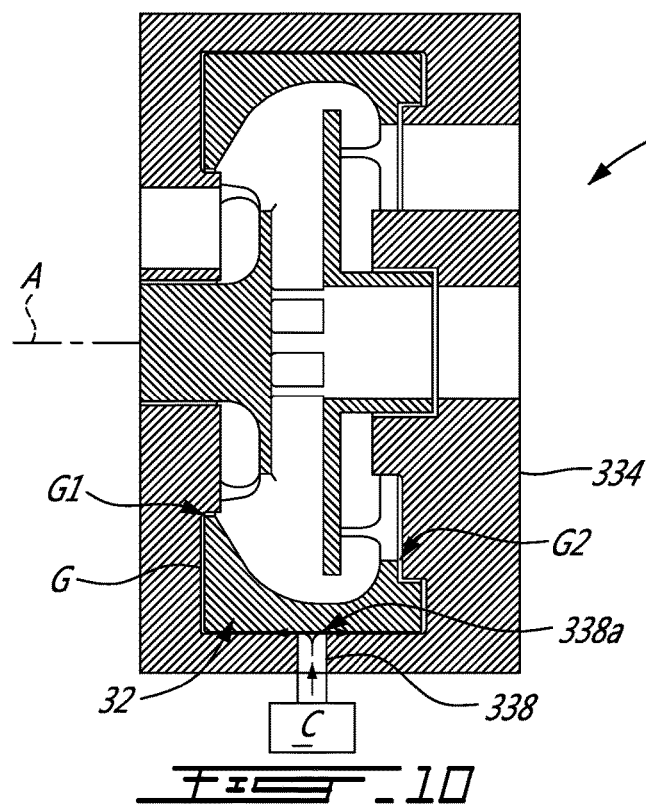

US 11,994,257 B2

CENTRIFUGAL DE-AERATOR FOR AIRCRAFT ENGINE

TECHNICAL FIELD

The disclosure relates generally to lubrication systems of aircraft engines and, more particularly, to systems and methods used to separate air from oil flowing in such lubrication systems.

BACKGROUND

Aircraft engines, such as gas turbine engines, include a lubrication system for distributing a lubricating fluid, such as oil for instance, to required portions of the engine. This lubricating oil may be directed to and from a bearing cavity of the aircraft engine, for example. Air may become mixed with said oil due to the compressed air used for pressurizing the bearing cavity, and the amount of air in the lubricating oil may thus increase after the oil has been fed through the bearing cavity. A de-aerator may be used in the lubrication system to remove at least a portion of the air from the oil.

SUMMARY

In one aspect, there is provided a de-aerator for a lubrication system of an aircraft engine, comprising: a housing defining an air-oil inlet, an oil outlet, and an air outlet of the de-aerator; a rotor received within the housing and rotatable relative to the housing about a central axis, the rotor having blades circumferentially distributed about the central axis and extending at least partially radially relative to the central axis, flow passages extending between the blades, the rotor having a hub circumferentially extending around the central axis and around the blades, the hub having a peripheral wall oriented radially inwardly and defining a fore opening leading to the flow passages; and a gap between the housing and the hub of the rotor, a portion of the housing received within the fore opening and axially overlapping the peripheral wall of the hub, the gap having a fore gap inlet between the portion of the housing and the peripheral wall of the hub.

In another aspect, there is provided a de-aerator for a lubrication system of an aircraft engine, comprising: a housing defining an air-oil inlet, an oil outlet, and an air outlet of the de-aerator; a rotor received within the housing and rotatable relative to the housing about a central axis, the rotor having blades circumferentially distributed about the central axis and extending at least partially radially relative to the central axis, the rotor having a hub circumferentially extending around the central axis and around the blades, the rotor having flow passages defined between the blades, the flow passages having passage inlets having a radial component oriented away from the central axis; and a gap between the hub of the rotor and the housing, the gap having a fore gap inlet on an inlet side of the de-aerator, the gap at the fore gap inlet facing a direction being mainly axial relative to the central axis.

In yet another aspect, there is provided a method of separating air from an air-oil flow with a de-aerator having a rotor rotatably received within a housing, comprising: receiving the air-oil flow via an air-oil inlet of the de-aerator in an axial direction relative to a central axis of the rotor; redirecting the received air-oil flow in a radial direction relative to the central axis and separating the air form the air-oil flow by centrifugation within the rotor; and limiting oil from flowing within a gap between the rotor and the housing by having an inlet of the gap facing a direction different than a flow direction of the air-oil flow.

BRIEF DESCRIPTION OF THE DRAWINGS

Reference is now made to the accompanying figures in which:

FIG. 7 is an enlarged view of the de-aerator of FIG. 6;

FIG. 7a is an enlarged view of zone Z1 of FIG. 7;

FIG. 7b is an enlarged view of zone Z2 of FIG. 7;

FIG. 8 is a schematic cross-sectional view of a de-aerator in accordance with one embodiment;

FIG. 9 is a schematic cross-sectional view of a de-aerator in accordance with one embodiment; and FIG. 10 is a schematic cross-sectional view of a de-aerator in accordance with one embodiment.

DETAILED DESCRIPTION

Figure 1:
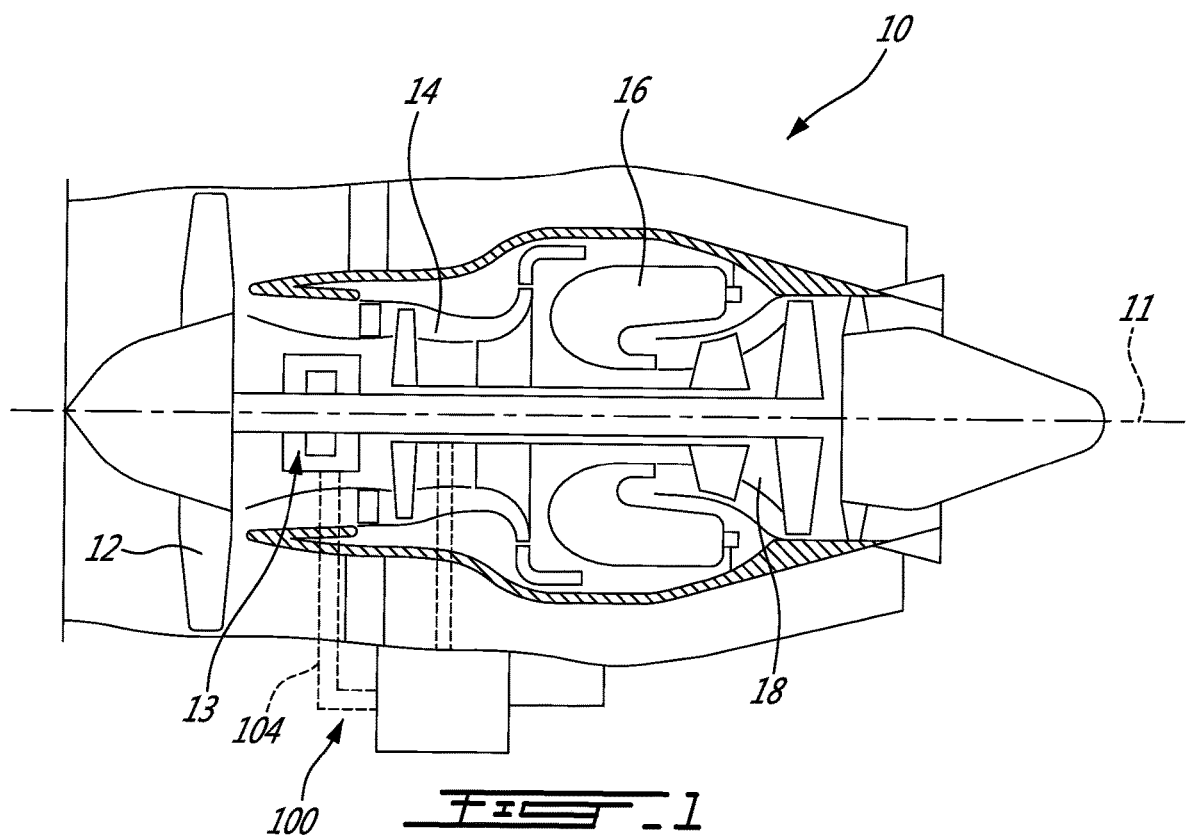
FIG. 1 is a schematic cross sectional view of an aircraft engine provided in the form of a gas turbine engine.

FIG. 1 illustrates an aircraft engine 10, such as a gas turbine engine, of a type preferably provided for use in subsonic flight. The gas turbine engine 10 generally includes in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

Figure 1A:
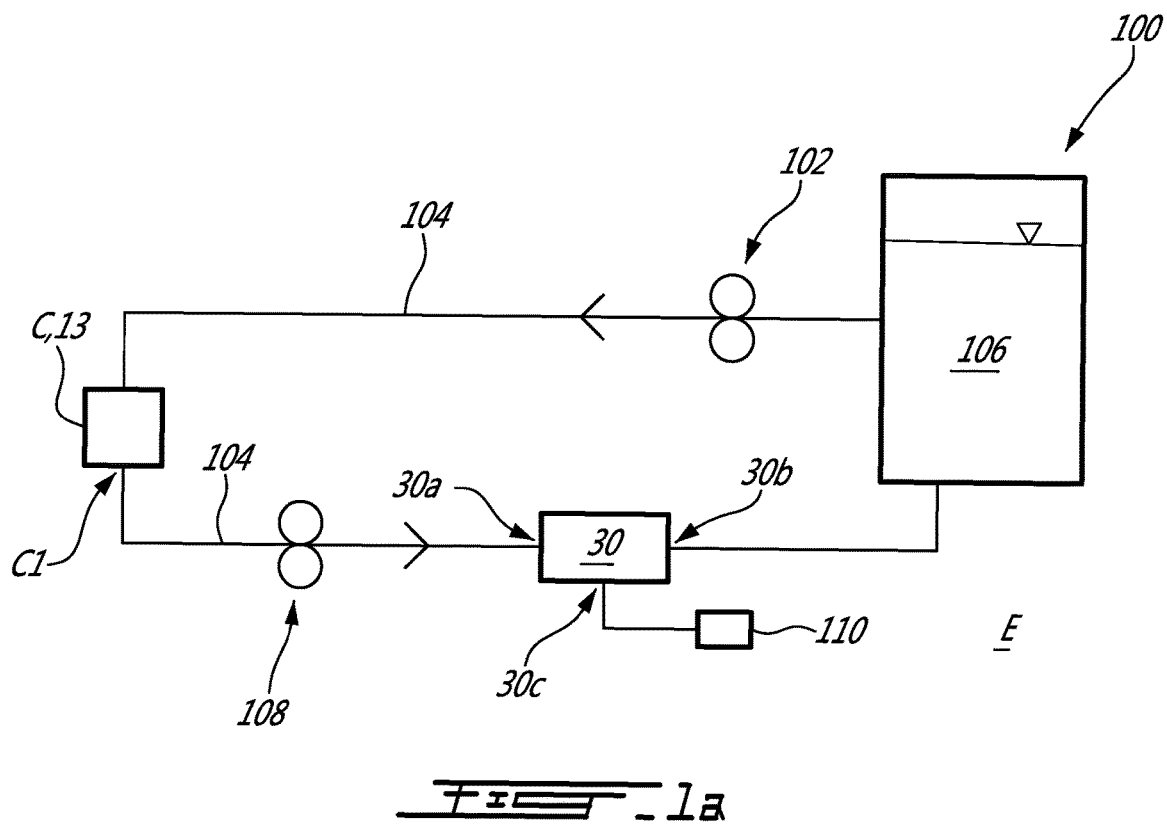
FIG. 1a is a schematic view of a lubrication system used with the aircraft engine of FIG. 1.

Referring to FIGS. 1 and 1a, the gas turbine engine 10 includes a lubrication system 100 that includes a pump 102, lubrication conduits 104, a lubricant reservoir 106, and a de-aerator 30. The lubrication system 100 may also include additional components such as valve(s), heat exchangers, filters, etc. The lubricant reservoir 106 is hydraulically connected to one or more components C of the engine 10 in need of lubrication, such as, for instance, bearing cavity(ies) 13, gearbox(es), and so on. The pump 102 is operable to induce a flow of the lubricant from the lubricant reservoir 106, to the one or more components C of the engine 10 in need of lubrication, and a scavenge pump 108 operable to draw a scavenge flow of oil back to the reservoir 106. The scavenge pump 108 has an inlet hydraulically connected to a scavenge outlet C1 of the component C and an outlet hydraulically connected to the de-aerator 30. In some cases, for instance when the component C is a bearing cavity 13, the oil flows through the bearing cavity 13 and is mixed with compressed air injected therein for pressurizing the bearing cavity 13. The oil mixture exiting the bearing cavity 13 may thus have a greater air content than the oil mixture entering the bearing cavity 13. The de-aerator 30 is operable to remove at least a portion of the air contained within the air-oil mixture it receives before flowing the oil back to the one or more components in need of lubrication. The de-aerator 30 has an air-oil inlet 30a hydraulically connected to the scavenge outlet C1 of the component C via the scavenge pump 108; an oil outlet 30b hydraulically connected to the reservoir 106 for returning the de-aerated oil back to the reservoir 106 from which it is drawn by the pump 102 for lubrication purposes; and an air outlet 30c hydraulically connected to a vent 110 for expelling the air out to an environment E outside the gas turbine engine 10. It will be appreciated that the location of some of the parts of the lubrication system 100 (e.g., scavenge pump 108, pump 102, vent 110) may differ from what is illustrated in FIG. 1a. Any suitable arrangement of the lubrication system 100 is contemplated. The de-aerator 30 may be included in any lubrication systems, such as those discloses U.S. patent application Ser. No. 16/791,375, the entire contents of which are incorporated herein by reference.

Figure 5:
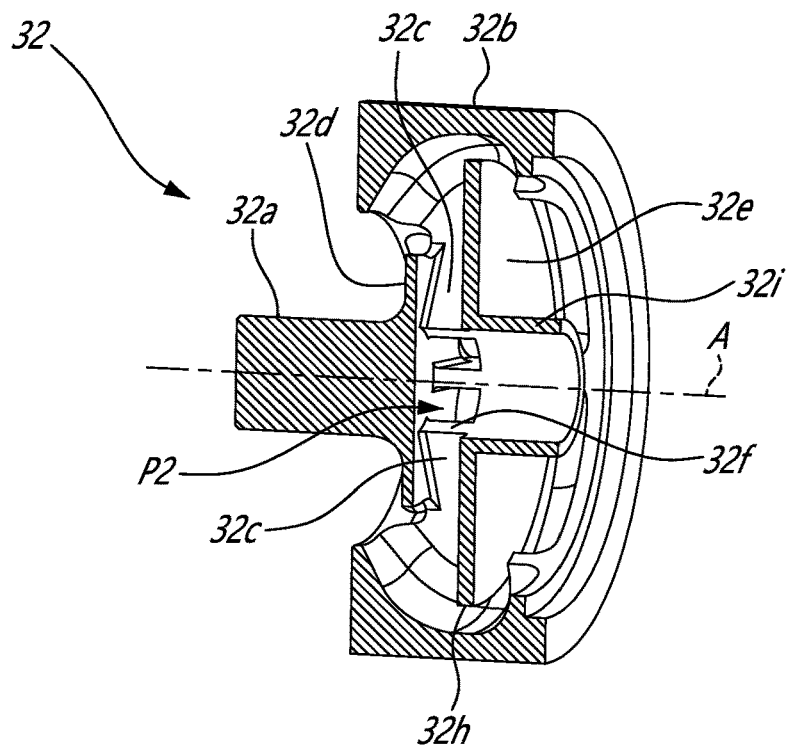
FIG. 5 is a schematic rear three dimensional cutaway view of the rotor of FIG. 2.
Figure 6:
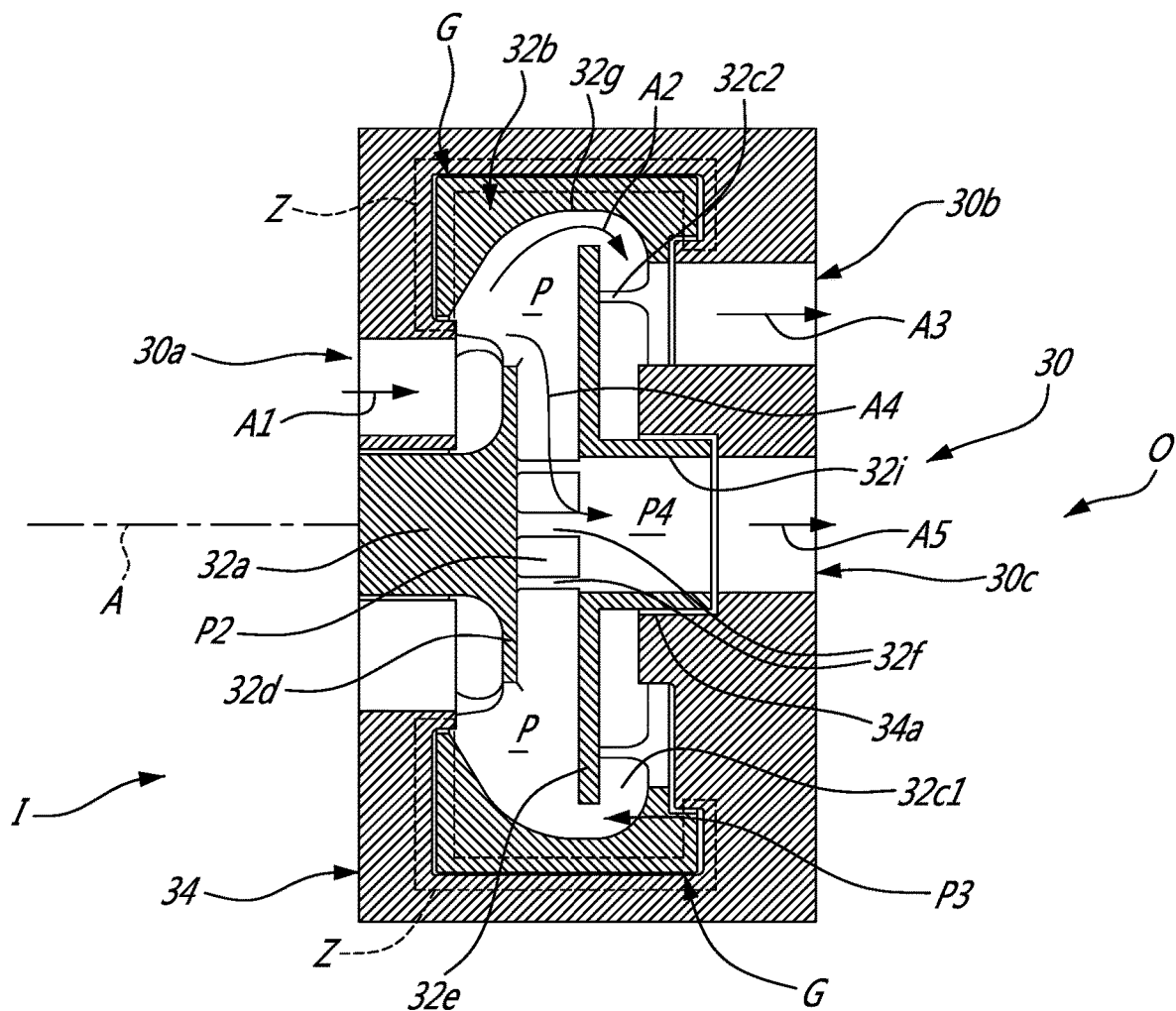
FIG. 6 is a schematic cross-sectional view of the de-aerator including the rotor of FIG. 2.

Referring now to FIGS. 2-6, the de-aerator 30 includes a rotor 32, also referred to as an impeller, and a stator, also referred to as a housing 34 (FIG. 6). The rotor 32 is received within the housing 34 and rotates relative to the housing 34 about a central axis A. As shown in FIG. 6, the de-aerator 30 has an inlet side I and an opposed outlet side O. The air-oil inlet 30a of the de-aerator 30 is located on the inlet side I. The oil outlet 30b and the air outlet 30c of the de-aerator 30 are located on the outlet side O of the de-aerator 30. In the embodiment shown, the air-oil inlet 30a, the oil outlet 30b, and the air outlet 30c are defined by the housing 34.

The rotor 32 has a shaft 32a that is drivingly engageable for receiving a rotational input. The rotational input may be provided by an electric motor, a shaft of the gas turbine engine 10 (FIG. 1), or any device able to generate a rotational input to the rotor 32. The rotor 32 has a hub 32b and blades 32c that are circumferentially distributed around the central axis A. The hub 32b extends circumferentially all around the central axis A and around the blades 32c. In the embodiment shown, the blades 32c are secured to a fore flange 32d that is secured to the shaft 32a and to an aft flange 32e. Both of the first and second flanges 32d, 32e are annular and extend all around the central axis A. The fore flange 32d is secured to the shaft 32a via a fillet. The fore flange 32d is used to redirect a flow of oil that enters the de-aerator 30 in a substantially axial direction relative to the central axis A to a substantially radial direction relative to the central axis A before said flow of oil meets the blades 32c. The blades 32c have radially inner ends 32f and radially outer ends 32g. In the embodiment shown, the radially outer ends 32g of the blades 32c are secured to the hub 32b of the rotor 32. In the embodiment shown, fillets are located at junctions between the blades 32c and the hub 32b. The radially inner ends 32f of the blades 32c are located axially between the fore and aft flanges 32d, 32e.

A plurality of flow passages P (FIGS. 2 and 6) are defined circumferentially between each two circumferentially adjacent ones of the blades 32c. The flow passages P have passage inlets P1 (FIG. 2) extending radially between a periphery of the first flange 32d and the hub 32b, extending circumferentially between each two adjacent ones of the blades 32c, and extending axially between the hub 32b and the fore flange 32d. In the depicted embodiment, the inlets P1 of the flow passages P face a direction which has a radial component relative to the central axis A. In the embodiment shown, the radial component of the inlets P1 of the flow passages P is oriented away from the central axis A. The flow passages P have air outlets P2 (FIGS. 5-6) proximate the central axis A. The air outlets P2 of the flow passages P are defined circumferentially between each of two adjacent ones of the radially inner ends 32f of the blades 32c and axially between the fore and aft flanges 32d, 32e.

The flow passages P further have oil outlets P3 (FIG. 3) located axially between the hub 32b and the aft flange 32e and circumferentially between the blades 32c. More specifically, a portion 32c1 (FIG. 6) of the blades 32c curves around the radially outer edge 32h (FIGS. 4-5) of the aft annular flange 32e. The oil outlets P3 are defined by the portion of the blades 32c that curve around the aft annular flange 32e. The portions 32c1 of the blades 32c that extend around the aft flange 32e have radially inner ends 32c2 (FIG. 6). The oil outlets P3 are defined circumferentially between each two adjacent ones of the radially inner ends 32c2 of the portions 32c1 of the blades 32c.

Still referring to FIGS. 2-6, the rotor 32 further has a hollow tube 32i secured to the second flange 32e. As illustrated more clearly in FIG. 6, the hollow tube 32i is rotatably received within a bore 34a of the housing 34. It will be appreciated that a bearing may be disposed between the bore 34a of the housing 34 and the hollow tube 32i. The hollow tube 32i has an internal passage P4 that is fluidly connected to the air outlets P2 of the flow passages P defined between the blades 32c of the rotor 32. The internal passage P4 defined by the hollow tube 32i may be hydraulically connected to the vent 110 (FIG. 1a) of the lubrication system 100 (FIG. 1) via suitable conduits for expelling the extracted air out of the lubrication system 100.

Figure 2:
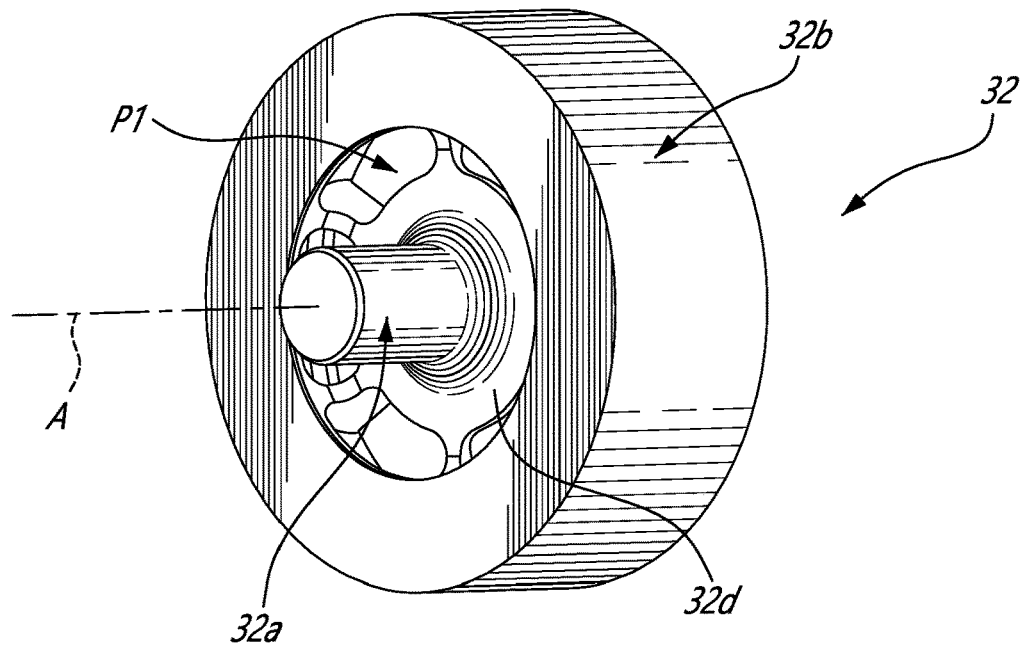
FIG. 2 is a schematic front three dimensional view of a rotor of a de-aerator in accordance with one embodiment that may be used within a lubrication system of the gas turbine engine of FIG. 1.

Referring more particularly to FIG. 6, in use, an air-oil mixture is received into the de-aerator 30 via the air-oil inlet 30a along arrow A1. The oil is diverted radially outwardly away from the central axis A by the fore flange 32d. The oil is then divided between the flow passages P upon rotation of the fore flange 32d and enters those flow passages P via their respective inlets P1 (FIG. 2). The oil is then impinged by the blades 32c of the rotor 32. Such impingement may cause separation of the air contained in the air-oil mixture from the oil. The separated oil flows within the flow passages P defined between the blades 32c, around the periphery 32h of the second flange 32e along arrow A2 (FIG. 6) and exits the flow passages P via the oil outlet P3 (FIG. 3) defined axially between the aft flange 32e and the hub 32b and circumferentially between the radially-inner ends 32c2 of the portions 32c1 of the blades 32c that extend aft of the aft flange 32e. The oil then exits the de-aerator 30 via the oil outlet 30b thereof along arrow A3. As shown in FIG. 1a, the extracted oil is then flown back to the reservoir 106 via which it is circulated to the components (e.g., bearing cavity 13) in need of lubrication. The air extracted from the air-oil mixture flows around a periphery of the first flange 32d along arrow A4, moves radially inwardly toward the central axis A, and exits the flow passages P via their air outlets P2 defined circumferentially between the radially-inner ends 32f of the portions of the blades 32c that are located between the fore and aft flanges 32d, 32e. The extracted air then flows into the passage P4 of the hollow tube 32i along arrow A5 and out of the de-aerator 30 via the bore 34a of the housing 34 and via the air outlet 30c of the de-aerator 30.

In the embodiment shown, the disclosed de-aerator 30 has solely two outlets: the oil outlet 30b and the air outlet 30c. In the present case, the de-aerator 30 has solely three connections to the oil system 100 (FIG. 1a), that is the air-oil inlet 30a, the air outlet 30c, and the oil outlet 30b, and is free of other connections to the oil system 100. The de-aerator 30 is an "active" de-aerator since it has at least one component (e.g., rotor 32) that is driven, such as by electrical and/or pneumatic and/or hydraulic or other means (motors, actuators, etc.). A de-aerator is different than a de-oiler. A de-oiler is typically located within a lubricated cavity (e.g., gear box) and is designed to remove oil (e.g., oil droplets/mist) within an air-oil mixture before ejecting air overboard. The de-aerator 30 is designed to extract air from an air-oil mixture and to feed oil back to the oil system 100. Typically, the de-oiler does not include a housing and is therefore not subjected to problems associated with oil trapped in a gap. Indeed, the housing of the de-aerator 30 is used to collect the oil extracted by centrifugation so that said extracted oil is flown back to the oil system. Since the de-oiler is located within the lubricated cavity, it does not need a housing and the oil may simply be ejected via centrifugation against the components in need of lubrication contained within the lubricated cavity (e.g., gears).

Referring more particularly to FIG. 6, a gap G is present between the rotor 32 and the housing 34. The gap G extends circumferentially all around the central axis A. It has been observed that, in some cases, oil may become trapped within the gap G. More specifically, as the oil is centrifuged by the rotor 32, a portion may flow into the gap G and may remain trapped because of the centrifugal effect. Oil may therefore be located within the gap G and all around the rotor 32 by centrifugal effect. The portion Z where oil may be trapped is shown with dashed lines in FIG. 6. In some cases, the trapped oil can generate heat as it is sheared between the rotor 32 and the housing 34. FIGS. 7-10 described below explain features that the de-aerator 30 may have to limit oil from being trapped in the gap G.

Referring to FIGS. 7 and 7a, the housing 34 has a fore annular shoulder 34b on the inlet side I of the de-aerator 30 and proximate the air-oil inlet 30a of the de-aerator 30. The fore annular shoulder 34b are herein oriented radially outwardly relative to the central axis A and faces the hub 32b. The hub 32b defines a fore opening 32j that leads into the flow passages P between the blades 32c of the rotor 32. The fore opening 32j of the hub 32 is defined by a substantially cylindrical peripheral wall 32j3 extending circumferentially around the central axis A and extending axially from a fore edge 32j1 to an aft edge 32j2 aft of the fore edge 32j1. A portion of the housing 34 overlaps the fore opening 32j of the hub 32. In the embodiment shown, a portion of the housing 34, which herein may correspond to the fore annular shoulder 34b of the housing 34, is received within the fore opening 32j and overlaps the peripheral wall 32j3 of the fore opening 32j of the hub 32. In the depicted embodiment, the fore annular shoulder 34b of the housing 34 extends axially beyond the aft edge 32j2 of the fore opening 32j of the hub 32b.

As shown in FIG. 7a, the gap G has a fore gap inlet G1 (dashed lines in FIG. 7a) between the hub 32b and the housing 34. The overlap between the fore annular shoulder 34b of the housing 34 and the fore opening 32j of the hub 32b is such that the fore gap inlet G1 has a radial component relative to the central axis A and that said radial component of the fore gap inlet G1 extends toward the central axis A. In other words, the fore gap inlet G1 extends circumferentially all around the central axis A, radially from the aft edge 32j2 of the peripheral wall 32j3 to an edge 34b1 of the fore annular shoulder 34b of the housing 34, and axially from said aft edge 32j2 of the peripheral wall 32j3 to the edge 34b1 of the fore annular shoulder 34b. The edge 34b1 of the fore annular shoulder 34b and the aft edge 32j2 of the peripheral wall 32j3 are axially offset from one another. Therefore, such an overlap between the hub 32b and the housing 34 may shield the fore gap inlet G1 from a flow F1 extending in a substantial radial direction relative to the central axis A and that is directed toward the inlets P1 of the flow passages P between the blades 32c of the rotor 32. Stated differently, for oil to enter into the gap G, it has to flow in a direction having a radial component that is in an opposite direction to a radial component of the flow F1 that is directed toward the flow passages P. This overlap may require the oil to change its direction to enter the gap G. Since the flow F1 of oil has a direction that may be mainly radial and away from the central axis A, the overlap between the shoulder 34b of the housing and the opening 32j of the hub 32b may make it more difficult for the oil to reach the gap G. In the embodiment shown, the gap G at the fore gap inlet G1 faces a direction D1 that is mainly axial relative to the central axis 11. This difference between the direction D1 of the gap G at the fore gap inlet G1 and the direction of the flow F1 may make it more difficult for the oil to reach the gap G. This may limit a quantity of oil trapped within the gap G compared to a configuration lacking such an overlap. In other words, on the inlet side I of the de-aerator 30, the overlap of the housing 34 and rotor 32 may make it more difficult for the oil to go through a path depicted by arrow A6 rather than a path depicted by arrow A7.

Referring now to FIGS. 7 and 7b, the hub 32b has an aft annular shoulder 32k that is oriented radially inwardly toward the central axis A and that faces an aft annular shoulder 34c of the housing 34. The aft annular shoulder 34c of the housing 34 is oriented radially away from the central axis A. The aft annular shoulder 34c of the housing 34 axially overlaps the aft annular shoulder 32k of the hub 32b of the rotor 32. In the embodiment shown, the hub 32b defines an aft opening 32l and has an annular face 32m extending radially relative to the central axis A from the aft opening 32l to the aft shoulder 32k. An aft gap inlet G2 (dashed line in FIG. 7b) of the gap G is located axially between the housing 34 and the annular face 32m of the hub 32b of the rotor 32. In the embodiment shown, the gap G at the aft gap inlet G2 faces a direction D2 that is mainly radial relative to the central axis 11. This similarity between the direction D2 of the gap G at the aft gap inlet G2 and the direction of a flow F2 between the blades 32c may make it more difficult for the oil to reach the gap G. On the outlet side O of the de-aerator 30, the disclosed geometry may create a complex path depicted by arrow A8 and it may be easier for the oil to go through a path depicted by arrow A9 instead.

Figure 3:
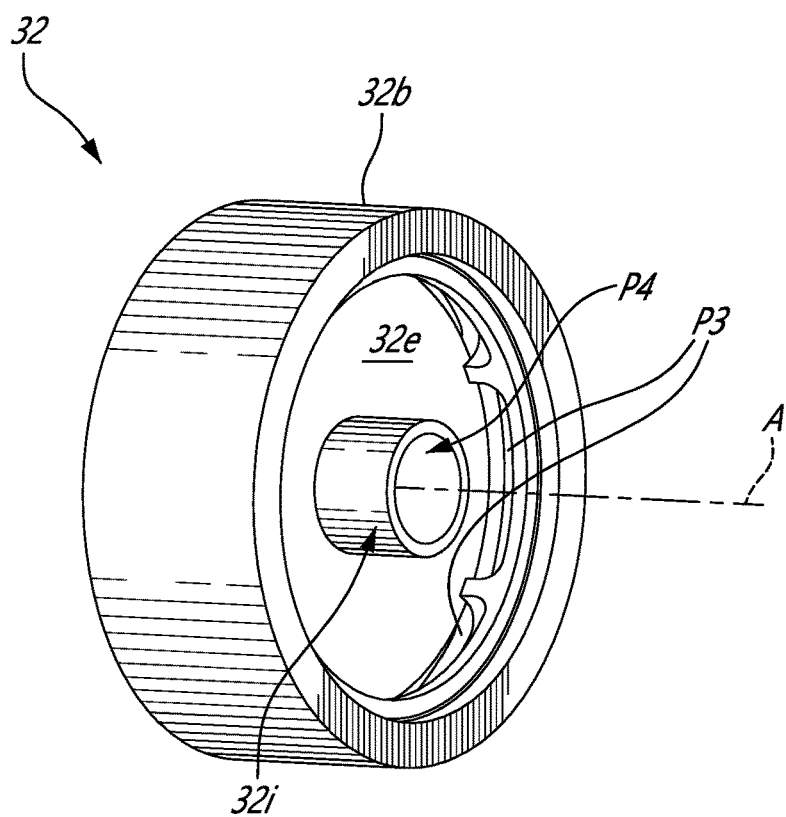
FIG. 3 is a schematic rear three dimensional view of the rotor of FIG. 2.
Figure 4:
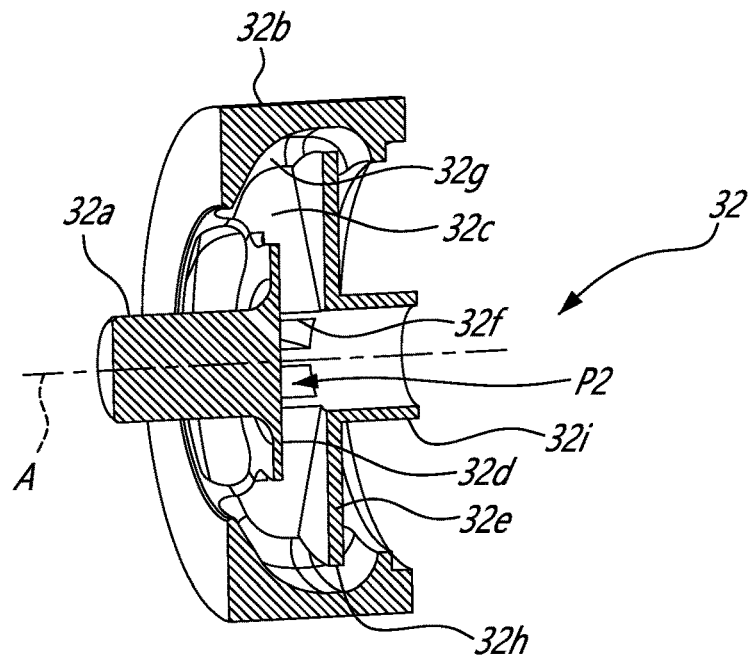
FIG. 4 is a schematic front three dimensional cutaway view of the rotor of FIG. 2.

As shown in FIGS. 5 and 7b, the oil curves around the outer edge 32h (FIG. 5) of the aft flange 32e (FIG. 5) along the arrow A2. Then, a flow of oil F2 (FIG. 7) flows in a direction being substantially radial toward the central axis A and toward the passage outlets P3 (FIG. 3). The aft gap inlet G2 has a radial component that extends away from the central axis A. Hence, for oil to enter into the gap G via the aft gap inlet G2, it has to flow in a direction having a radial component that is in an opposite direction to a radial component of the flow F2 that is directed toward the central axis A. This orientation of the aft gap inlet G2 may require the oil to change its direction to enter the gap G. Since the flow F2 of oil has a direction that may be mainly radial and toward the central axis A, having the aft gap inlet G2 oriented radially away from the central axis A may contribute in limiting oil from entering the gap G via the aft gap inlet G2.

As shown in FIG. 7b, the overlap between the aft shoulder 34c of the housing 34 and the aft shoulder 32k of the hub 32b creates herein a tortuous flow path T within the gap G. Such a tortuous flow path T may increase a resistance of the flow within the gap G and may contribute in limiting oil from flowing within the gap G. This may limit a quantity of oil trapped within the gap G compared to a configuration lacking such an overlap.

Referring to FIG. 7, in the embodiment shown, the oil outlet 30b of the de-aerator 30 includes a bore 34d defined by the housing 34; the bore 34d is herein located at an upper halve of the housing 34 and radially offset from the central axis A. Other locations of the bore 34d are contemplated. As shown in FIG. 7, a peripheral wall 34e of the bore 34 is radially aligned with a top portion of the aft opening 32l (FIG. 7b) of the hub 32b.

Referring now to FIG. 8, a de-aerator in accordance with another embodiment is shown generally at 130. For the sake of conciseness, only elements that differ from the de-aerator 30 described above with reference to FIGS. 2-7 are described herein below.

In the embodiment shown, the housing 134 of the de-aerator 130 defines a drain conduit 136. The drain conduit 136 has a drain inlet 136a that is hydraulically connected to the gap G between the fore gap inlet G1 and the aft gap inlet G2. The drain conduit 136 has a drain outlet 136b that is hydraulically connected to the air-oil inlet 130a of the de-aerator 130. In the embodiment shown, the drain conduit 136 is located at an upper halve of the housing 134. The drain conduit 136 may be located anywhere along a circumference of the housing 134. In use, the flow of the air-oil mixture along arrow A1 may create a pressure drop within the drain conduit 136 that may induce a flow F3 within the drain conduit 136 for suctioning the oil trapped in the gap G from the drain inlet 136a to the drain outlet 136b. The flow F3 is influenced at least partially by the centrifugal force exerted to the oil via rotation of the rotor 32. The oil extracted from the gap G may be redirected into the fluid passages P of the rotor 32 for separation.

Referring now to FIG. 9, a de-aerator in accordance with another embodiment is shown generally at 230. For the sake of conciseness, only elements that differ from the de-aerator 30 described above with reference to FIGS. 2-7 are described herein below.

In the embodiment shown, the housing 234 of the de-aerator 230 defines a drain conduit 236. The drain conduit 236 has a drain inlet 236a that is hydraulically connected to the gap G between the fore gap inlet G1 and the aft gap inlet G2. The drain conduit 236 has a drain outlet 236b that is hydraulically connected to the air outlet 230c of the de-aerator 230. In the embodiment shown, the drain conduit 236 is located at a lower halve of the housing 234. The drain conduit 236 may be located anywhere along a circumference of the housing 234. In use, the flow of the air along arrow A5 via the air outlet 230c may create a pressure drop within the drain conduit 236 that may induce a flow F4 within the drain conduit 236 for suctioning the oil trapped in the gap G form the drain inlet 236a to the drain outlet 236b. The flow F4 is influenced at least partially by the centrifugal force exerted to the oil via rotation of the rotor 32.

Referring now to FIG. 10, a de-aerator in accordance with another embodiment is shown generally at 330. For the sake of conciseness, only elements that differ from the de-aerator 30 described above with reference to FIGS. 2-7 are described herein below.

In the embodiment shown, the de-aerator 300 has a blow conduit 338 that is located at a lower halve of the housing 334. The blow conduit 338 may be located anywhere along a circumference of the housing 334. The blow conduit 338 is herein defined by the housing 334. The blow conduit 338 may be fluidly connected to a source of compressed air C and may have an outlet 338a hydraulically connected to the gap G between the fore gap inlet G1 and the aft gap inlet G2. The source of compressed air C may be, for instance, the compressor section 14 of the gas turbine engine 10 (FIG. 1). Blowing the air within the gap G may prevent the oil from penetrating into the gap G since said oil would have to overcome the airflow exiting the gap G via the fore and aft gap inlets G1, G2. In a particular embodiment where the drain conduit 236 of FIG. 9 and the blow conduit 338 of FIG. 10 are used in conjunction, the blow outlet 338a may be located between the drain inlet 236a and the fore gap inlet G1.

In a particular embodiment, combining the features of the complex flow path and overlap described above with reference to FIGS. 7, 7a, 7b with one or both of the drain conduits 136, 236 described above with reference to FIGS. 8 and 9 may limit the amount of oil trapped between the rotor 32 and the housing 34, 134, 234. Indeed, if some oil manages to get trapped within the gap G, it may be drained out of the gap G via the drain conduits 136, 236. In a particular embodiment, combining the features of the drain conduits 136, 236 described above with reference to FIGS. 8 and 9 with the blow conduit 338 described above with reference to FIG. 10 may ensure that the air that is blown within the gap G via the blow conduit 338 is returned through the drain passage to the air outlet 30c of the de-aerator instead of the oil outlet 30b of said de-aerator. In a particular embodiment, the blow conduit 338 described above with reference to FIG. 10 may be combined with the complex flow path and overlap described above with reference to FIGS. 7, 7a, and 7b on the outlet side O of the de-aerator 30 to ensure that the air blown may not be mixed with the oil on the oil outlet 30b of the de-aerator 30. It will be appreciated that the features described above with reference to FIGS. 8 to 10 may be combined with the de-aerator 30 of FIG. 7. Any combinations of those features are contemplated without departing from the scope of the present disclosure.

For separating the air from the air-oil flow, the air-oil mixture is received via the air-oil inlet 30a of the de-aerator 30 in an axial direction relative to a central axis A of the rotor 32; the received air-oil flow is redirected in a radial direction relative to the central axis A and the air is separated from the air-oil flow by centrifugation within the rotor 32; and the oil is limited from flowing within the gap G between the rotor 32 and the housing 34 by having the inlet of the gap G facing a direction different than a flow direction of the air-oil flow. In the embodiment shown, compressed air is injected into the gap G and/or the oil is drained out from the gap.

Embodiments disclosed herein include:

A. A de-aerator for a lubrication system of an aircraft engine, comprising: a housing defining an air-oil inlet, an oil outlet, and an air outlet of the de-aerator; a rotor received within the housing and rotatable relative to the housing about a central axis, the rotor having blades circumferentially distributed about the central axis and extending at least partially radially relative to the central axis, flow passages extending between the blades, the rotor having a hub circumferentially extending around the central axis and around the blades, the hub having a peripheral wall oriented radially inwardly and defining a fore opening leading to the flow passages; and a gap between the housing and the hub of the rotor, a portion of the housing received within the fore opening and axially overlapping the peripheral wall of the hub, the gap having a fore gap inlet between the portion of the housing and the peripheral wall of the hub.

B. A de-aerator for a lubrication system of an aircraft engine, comprising: a housing defining an air-oil inlet, an oil outlet, and an air outlet of the de-aerator; a rotor received within the housing and rotatable relative to the housing about a central axis, the rotor having blades circumferentially distributed about the central axis and extending at least partially radially relative to the central axis, the rotor having a hub circumferentially extending around the central axis and around the blades, the rotor having flow passages defined between the blades, the flow passages having passage inlets having a radial component oriented away from the central axis; and a gap between the hub of the rotor and the housing, the gap having a fore gap inlet on an inlet side of the de-aerator, the gap at the fore gap inlet facing a direction being mainly axial relative to the central axis.

Embodiments A and B may include any of the following elements, in any combinations:

Element 1: the portion of the housing is a fore annular shoulder on an inlet side of the de-aerator, proximate the air-oil inlet, and oriented radially outwardly relative to the central axis. Element 2: the peripheral wall of the fore opening extends axially from a fore edge to an aft edge, the fore annular shoulder of the housing extending axially beyond the aft edge of the peripheral wall. Element 3: the housing defines an aft annular shoulder on an outlet side of the de-aerator and oriented radially outwardly relative to the central axis, the aft annular shoulder axially overlapping and facing an aft shoulder of the hub. Element 4: the hub has an aft peripheral wall oriented radially inwardly relative to the central axis and defining an aft opening communicating with the flow passages, the hub having an annular face extending radially from the aft opening to the aft shoulder, the annular face radially overlapping the housing, the gap having an aft gap inlet defined between the housing and the annular face of the hub. Element 5: the oil outlet is defined by the housing and is radially offset from the central axis. Element 6: a blow conduit having a blow inlet for receiving compressed air and a blow outlet hydraulically connected to the gap between the fore gap inlet of the gap on an inlet side of the de-aerator and an aft gap inlet on an outlet side of the de-aerator. Element 7: a drain conduit having a drain inlet hydraulically connected to the gap between the fore gap inlet and an aft gap inlet, and a drain outlet hydraulically connected to the air-oil inlet and/or to the air outlet of the de-aerator. Element 8: the flow passages have passage outlets having a radial component oriented toward the central axis, the gap having and an aft gap inlet on an outlet side of the de-aerator, the aft gap inlet having a radial component extending away from the central axis. Element 9: the rotor includes an aft annular flange extending circumferentially around the central axis, a portion of the blades curving around a radially outer edge of the aft annular flange, the passage outlets defined axially between the hub and the aft annular flange and circumferentially between the blades. Element 10: the rotor has a fore annular flange, the passage inlets defined circumferentially between the blades and axially between the hub and the fore annular flange. Element 11: the housing defines a fore annular shoulder on the inlet side of the de-aerator and oriented radially outwardly relative to the central axis and facing the hub, the fore gap inlet defined radially between the fore annular shoulder of the housing and the hub of the rotor. Element 12: a drain conduit having a drain inlet hydraulically connected to the gap between the fore gap inlet and an aft gap inlet on an outlet side of the de-aerator. Element 13: a drain outlet of the drain conduit is hydraulically connected to the air-oil inlet. Element 14: a drain outlet of the drain conduit is hydraulically connected to the air outlet. Element 15: a blow conduit having a blow inlet for receiving compressed air and a blow outlet hydraulically connected to the gap between the fore gap inlet and the aft gap inlet. Element 16: the rotor has a shaft rotatably received within the housing, the hub of the rotor defining a fore opening leading to the flow passages and radially between the hub and the shaft, a portion of the housing received within the fore opening, the fore gap inlet defined between the hub at the fore opening and the portion of the housing.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A de-aerator for a lubrication system of an aircraft engine, comprising:
    a housing defining an air-oil inlet, an oil outlet, and an air outlet of the de-aerator;
    a rotor received within the housing and rotatable relative to the housing about a central axis, the rotor having blades circumferentially distributed about the central axis and extending at least partially radially relative to the central axis, flow passages extending between the blades, the rotor having a hub circumferentially extending around the central axis and around the blades, the blades extending radially inwardly from the hub towards the central axis, the hub having a peripheral wall oriented radially inwardly and defining a fore opening leading to the flow passages; and
    a gap between the housing and a peripheral outer face of the hub of the rotor, the peripheral outer face extending all around the central axis, a portion of the housing received within the fore opening and axially overlapping the peripheral wall of the hub, the gap having a fore gap inlet between the portion of the housing and the peripheral wall of the hub.

2. The de-aerator of claim 1, wherein the portion of the housing is a fore annular shoulder on an inlet side of the de-aerator, proximate the air-oil inlet, and oriented radially outwardly relative to the central axis.

3. The de-aerator of claim 2, wherein the peripheral wall of the fore opening extends axially from a fore edge to an aft edge, the fore annular shoulder of the housing extending axially beyond the aft edge of the peripheral wall.

4. The de-aerator of claim 1, wherein the housing defines an aft annular shoulder on an outlet side of the de-aerator and oriented radially outwardly relative to the central axis, the aft annular shoulder axially overlapping and facing an aft shoulder of the hub.

5. The de-aerator of claim 4, wherein the hub has an aft peripheral wall oriented radially inwardly relative to the central axis and defining an aft opening communicating with the flow passages, the hub having an annular face extending radially from the aft opening to the aft shoulder, the annular face radially overlapping the housing, the gap having an aft gap inlet defined between the housing and the annular face of the hub.

6. The de-aerator of claim 5, wherein the oil outlet is defined by the housing and is radially offset from the central axis.

7. The de-aerator of claim 1, further comprising a blow conduit having a blow inlet for receiving compressed air and a blow outlet hydraulically connected to the gap between the fore gap inlet of the gap on an inlet side of the de-aerator and an aft gap inlet on an outlet side of the de-aerator.

8. The de-aerator of claim 1, further comprising a drain conduit having a drain inlet hydraulically connected to the gap between the fore gap inlet and an aft gap inlet, and a drain outlet hydraulically connected to the air-oil inlet and/or to the air outlet of the de-aerator.

9. A de-aerator for a lubrication system of an aircraft engine, comprising:
 a housing defining an air-oil inlet, an oil outlet, and an air outlet of the de-aerator;
 a rotor received within the housing and rotatable relative to the housing about a central axis, the rotor having blades circumferentially distributed about the central axis and extending at least partially radially relative to the central axis, the rotor having a hub circumferentially extending around the central axis and around the blades, the blades extending radially inwardly from the hub towards the central axis, the hub extending all around the central axis, the rotor having flow passages defined between the blades, the flow passages having passage inlets having a radial component oriented away from the central axis; and
 a gap between the hub of the rotor and the housing, the gap having a fore gap inlet on an inlet side of the de-aerator, the gap at the fore gap inlet facing a direction being mainly axial relative to the central axis.

10. The de-aerator of claim 9, wherein the flow passages have passage outlets having a radial component oriented toward the central axis, the gap having and an aft gap inlet on an outlet side of the de-aerator, the aft gap inlet having a radial component extending away from the central axis.

11. The de-aerator of claim 10, wherein the rotor includes an aft annular flange extending circumferentially around the central axis, a portion of the blades curving around a radially outer edge of the aft annular flange, the passage outlets defined axially between the hub and the aft annular flange and circumferentially between the blades.

12. The de-aerator of claim 9, wherein the rotor has a fore annular flange, the passage inlets defined circumferentially between the blades and axially between the hub and the fore annular flange.

13. The de-aerator of claim 9, wherein the housing defines a fore annular shoulder on the inlet side of the de-aerator and oriented radially outwardly relative to the central axis and facing the hub, the fore gap inlet defined radially between the fore annular shoulder of the housing and the hub of the rotor.

14. The de-aerator of claim 9, further comprising a drain conduit having a drain inlet hydraulically connected to the gap between the fore gap inlet and an aft gap inlet on an outlet side of the de-aerator.

15. The de-aerator of claim 14, wherein a drain outlet of the drain conduit is hydraulically connected to the air-oil inlet.

16. The de-aerator of claim 14, wherein a drain outlet of the drain conduit is hydraulically connected to the air outlet.

17. The de-aerator of claim 9, further comprising a blow conduit having a blow inlet for receiving compressed air and a blow outlet hydraulically connected to the gap between the fore gap inlet and the aft gap inlet.

18. The de-aerator of claim 9, wherein the rotor has a shaft rotatably received within the housing, the hub of the rotor defining a fore opening leading to the flow passages and radially between the hub and the shaft, a portion of the housing received within the fore opening, the fore gap inlet defined between the hub at the fore opening and the portion of the housing.

* * * * *